006
United States Patent [19]

Hedge

[11] 3,855,328

[45] Dec. 17, 1974

[54] ISOMERIZATION AND/OR TRANSALKYLATION AND/OR DISPROPORTIONATION OF ALKYLNAPHTHALENES

[75] Inventor: John A. Hedge, Wilmington, Del.

[73] Assignee: Sun Research and Development Co., Philadelphia, Pa.

[22] Filed: Dec. 14, 1971

[21] Appl. No.: 207,870

[52] U.S. Cl......... 260/668 A, 260/668 F, 260/672 T
[51] Int. Cl............................ C07c 5/24, C07c 3/62
[58] Field of Search.......... 260/668 A, 668 F, 672 T

[56] References Cited
UNITED STATES PATENTS

| | | | |
|---|---|---|---|
| 3,679,769 | 7/1972 | Kmecak et al.............. | 260/668 A |
| 3,551,509 | 12/1970 | Thomas et al................. | 260/672 T |
| 3,597,491 | 8/1971 | Kovech et al................. | 260/672 T |
| 3,140,253 | 7/1964 | Plank et al...................... | 208/120 |
| 3,370,099 | 2/1968 | Plank et al...................... | 260/668 A |
| 3,385,906 | 5/1968 | Kaufman....................... | 260/672 T |
| 3,527,824 | 9/1970 | Pollitzer....................... | 260/672 T |
| 3,770,841 | 11/1973 | Meyers.......................... | 260/668 A |

Primary Examiner—C. Davis
Attorney, Agent, or Firm—George L. Church; J. Edward Hess; Barry A. Bisson

[57] ABSTRACT

Alumino-silicate zeolites (preferably zeolites containing polyvalent metal cations) can be used to catalyze alkyl transfer, e.g., isomerization, transalkylation and disproportionation of alkylnaphthalenes. The "water" content of the zeolite and the reaction conditions (particularly temperature and space velocity) can be selected so as to favor one such reaction over the others. The preferred zeolites are at least 10 percent crystalline by X-ray, can adsorb benzene, and have an atomic ratio Al/Si in the range of 1.0–0.1. One preferred zeolite has the faujasite framework structure (e.g., Linde Type Y) and contains rare earth cations (e.g., Ce and/or La etc.).

13 Claims, 4 Drawing Figures

ISOMERIZATION AND/OR TRANSALKYLATION AND/OR DISPROPORTIONATION OF ALKYLNAPHTHALENES

CROSS REFERENCES TO RELATED APPLICATIONS

U.S. application, Ser. No. 7,273, filed Jan. 30, 1970, of John A. Hedge (now U.S. Pat. No. 3,668,267, issued June, 6, 72), discloses a method for separation of 2,6 DMN from 2,7 DMN by adsorption on certain molecular sieve zeolites. U.S. Application Ser. No. 99,280 of George Suld and Ralph L. Urban describes a pulse microreactor which can be used for experimental work relative to the present invention. U.S. Application Ser. No. 716,190, filed Mar. 26, 1968, of Kirsch, Barmby and Potts discloses methods for activation of zeolite catalysts to control water content. The following application, filed the same day as the present application, describes certain catalysts and processes for isomerization, disproportionation and hydroisomerication of dimethylnaphthalenes:

| SERIAL NO. | INVENTOR(S) | TITLE |
|---|---|---|
| 208,001 now U.S. Pat. No. 3,803,253 | George Suld and Ralph L. Urban | HYDROISOMERIZATION OF DIMETHYL-NAPHTHALENES USING A CALCIUM ZEOLITE CATALYST |

The entire disclosure of these copending applications is hereby incorporated herein by this reference.

BACKGROUND OF THE INVENTION

It has been reported ([J. Org. Chem. 29, 2,939 (1964)] that three independent dimethylnaphthalene (DMN) family groups exist among the 10 DMN isomers. These families are depicted below:

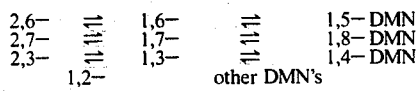

Although DMN's are freely isomerizable within the individual groups, in the presence of an acid catalyst, there is no interconversion of DMN's between the families. This phenomenon, not predictable a priori on the basis of alkylbenzene chemistry is a consequence of high energy barriers for the intermolecular 1,2-methyl shift between the adjacent $\beta$—$\beta'$ positions as well as between the rings of the naphthalene nucleus.

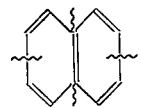

The height of the energy barriers is a direct function of the electronic structure of the naphthalene nucleus and the specific reaction mechanism underlying the intramolecular 1,2-alkyl shift.

Prior art acid catalysis has involved such catalysts as HF—$BF_3$ [(see U.S. Pat. No. 3,249,645 of Suld, issued May 3, 1966 (cl. 260–672) and G. Suld and A. P. Stuart, J Org. Chem., 29 2,939 (1964)]

U.S. Pat. No. 2,385,524 teaches transalkylation of a mixture of polyalkylated cyclic hydrocarbons by contact with an alumina containing catalyst and a hydrogen halide.

U.S. Pat. No. 3,336,411 to Benham, issued Aug. 15, 1967 teaches a process for preparation of 2,6-dimethylnaphthalene which uses a silica-alumina catalyst for isomerization of dimethylnaphthalenes.

U.S. Pat. No. 3,233,002 to Kovach, et al., issued Feb. 1, 1966 (Cl. 260–672) teaches contacting a polyalkyl aromatic feed stock under transmethylation and disproportionation conditions at 400°–800°F., 0–1,000 p.s.i.g. in the presence of free hydrogen and a catalyst consisting essentially of chromia-zinc oxide-copper oxides on a silica alumina support.

U.S. Pat. No. 3,281,483 to Benesi, et al., issued Oct. 25, 1966 (cl. 260–672) teaches the disproportionation of a $C_7$–$C_{15}$ alkyl aromatic hydrocarbon at 200°–600°C. with a hydrogen mordenite catalyst. Also taught is the use of hydrogen in conjunction with a mordenite containing a Group I-B, VI-B or Iron Group metal.

For transalkylation of a polyalkylated aromatic compound with an alkylatable aromatic compound, U.S. Pat. No. 3,410,921 of Pollitzer, issued Nov. 12, 1968 (cl. 260–672) teaches the use of hydrogen pressure and a catalyst comprising a Group VIII metal component on a solid support comprising an alumina matrix having suspended thereon less than about 20 weight percent of a finely divided crystalline aluminosilicate. For transalkylation of toluene, U.S. Pat. No. 3,417,157 of Pollitzer, issued Dec. 17, 1968 (cl. 260–672) teaches contact with hydrogen at a temperature in the range of about 400°–520°C. with a catalyst comprising a crystalline aluminosilicate, a Group VIII metal, and, as an additional component, arsenic, antimony, bismuth, selenium, tellurium or compounds thereof.

Crystalline and partially crystalline aluminosilicate zeolites are well known in the art, see for example U.S. Pat. No. 3,140,253 to Plank, et al., issued July 7, 1964 (cl. 208–120). As is shown in the above referred application of Kirsch, et al., long exposure to elevated temperature, as at cracking temperatures, can greatly reduce or even completely destroy the crystallinity of a zeolite.

SUMMARY OF THE INVENTION

Alumino-silicate zeolites (preferably zeolites containing polyvalent metal cations) can be used to catalyze alkyl transfer, e.g., isomerization, transalkylation and disproportionation of alkylnaphthalenes. The water content of the zeolite and the reaction conditions (particularly temperature and space velocity) can be selected so as to favor one such reaction over the others. The preferred zeolites are at least 10 percent crystalline by X-ray, can adsorb benzene, and have an atomic ratio Al/Si in the range of 1.0–0.1. One preferred zeolite has the faujasite framework structure (e.g., Linde Type Y) and contains rare earth cations, (e.g., Ce and/or La, etc.).

A process for isomerization and/or transalkylation and/or disproportionation of alkylnaphthalenes (DMN's), particularly to produce 2,6 and/or 2,7 dimethylnaphthalenes (DMN's) comprises contacting a feed rich in said alkylnaphthalenes with hydrogen (e.g., 15–1,500 p.s.i.g.) in the presence of an aluminosilicate zeolite catalyst (preferably in the range of 10–100 percent crystalline and of the faujasite structure) at a temperature in the range of 120°–300°C. (preferably in liquid phase) and at a liquid hourly space velocity in the 1,2–, 1,3–of 0.1–20 (preferably 1–10, e.g., about 5.0). The preferred zeolite contains exchange polyvalent metal cations and has a ratio Al/Si in the range of 0.35–1.0 in the alumino-silicate framework. The more preferred zeolites are synthetic faujasites having an Al/Si framework ratio in the range of 0.35 to 0.65 (e.g., Linde Type Y). In a preferred process, 1,6–DMN is isomerized (with minimum cracking or disproportionation) to 2,6–DMN. Note that such an isomerization can not convert 1,7–, 2,7–, 1,3–, 1,4–or 2,3–DMN into the 2,6 isomer.

One embodiment is a process whereby rare earth-exchanged Type Y molecular sieve (Linde SK–500) is used to catalyze the conversion of 1,6–DMN to 2,6–DMN. Temperatures of 120°–200°C. are preferred. Above 200°C, disproportionation reactions predominate. Below 120°C. the rate of isomerization is quite slow. The catalyst is activated at 400°–600°C. to remove water and generate strongly acidic sites. Small amounts of hydrogen may be added to the isomerization to prolong catalyst life.

The feed stock to this isomerization process should be low in 2,3–DMN, 2,7–DMN, and 1,7–DMN in order to avoid eutectic problems in the subsequent 2,6–DMN precipitation step. Therefore, a desirable charge stock is a 507°–520°F heart-cut from an extract of catalytic gas oil which is cooled to 0°F. and filtered to remove 2,6–DMN, 2,7–DMN, and 2,3–DMN solid isomers. This 507°–520°F. cut excludes most of the 1,7–DMN (b.p. 505°F.) and is enriched in 1,6–DMN (b.p. 510°F.). Typical feeds contain 25–30 percent 1,6–DMN.

The 1,6–DMN enriched feed stock is isomerized over rare earth-exchanged Molecular sieve. The isomerized mixture is distilled to yield a 495°–507°F. heart-cut which is rich in 2,6–DMN and quite low in 2,7–DMN and 2,3–DMN. A 507°–520°F. cut will contain 2,3–DMN produced from 1,3–DMN by this same isomerization process and will contain 1,6–DMN for recycle to the isomerization.

For example, pure 2,6–DMN can be isomerized to an equilibrated mixture of 53 percent 2,6–DMN, 40 percent 1,6–DMN and 7 percent 1,5–DMN.

The process can also be used for the isomerization of 1,7–DMN to 2,7–DMN.

In another embodiment, Disproportionation of a feed containing trimethylnaphthalenes and an approximately equimolar ratio of monomethylnaphthalenes, over rare earth-exchanged Type Y molecular sieve (e.g., Linde SK–500), can produce a significant amount of dimethylnaphthalenes. Temperatures of 150°–350°C. are preferred with a more preferred range being 200°–240°C. Below 200°C. isomerization reactions predominate. The catalyst is activated at 400° – 600°C. to remove water and generate strongly acidic sites. Small amounts of hydrogen may be added to the disproportionation reactor to prolong catalyst life.

For example, feed stock can be two distillate fractions of catalytic gas oil (or of an extract thereof), one rich in $C_{11}$ dicyclic aromatics and one rich in $C_{13}$ dicyclic aromatics (e.g., boiling ranges 450°–495°F and 530°–560°F., respectively). Typical equilibrium products from such a feed (at 210°C.,) are:

| | | |
|---|---|---|
| $C_{11}$ | 12.6 | Others |
| | 10.6 | % B-methylnaphthalene |
| | 4.2 | % α-methylnaphthalene |
| | 0.3 | Biphenyl |
| | 0.1 | 1 & 2 Ethylnaphthalene |
| | 5.9 | % 2,6–DMN |
| $C_{12}$ | 6.2 | % 2,7–DMN |
| | 6.6 | % 1,6–DMN |
| | 18.1 | % Other DMN's |
| | 2.8 | % 2,3–DMN |
| $C_{13}$ | 32.6 | % Trimethylnaphthalenes |
| | 100.0 | |

In experimental work the charge stock used was dimethylnaphthalenes (the reverse reaction), but the equilibrium values should remain relatively constant, regardless of the feed used.

Another charge is the $C_{11}$ fraction alone, which can be disproportionated to napthalene and dimethylnaphthalenes.

Another, but less preferred, charge stock is naphthalene mixed with about two moles of $C_{13}$ aromatics.

Alkylaromatics (such as DMN's) can be isomerized or disproportionated to more desired isomers in the presence of any one or any combination of the metal-exchanged, Type Y molecular sieve catalysts shown in the following table.

| Catalyst | 1,7/2,7-DMN Ratio after 1 hr. at 190°C | % Disproportionation |
|---|---|---|
| Lanthanum - Y | 0.77 | 31.2 |
| Cerium - Y | 0.75 | 19.3 |
| Rare Earth - Y | 0.63 | 7.1 |
| Hydrogen - Y | 0.59 | 4.7 |
| Palladium - Y | 0.41 | 6.8 |
| Nickel - Y | 0.06 | 1.3 |
| Copper - Y | 0.01 | 1.2 |

2,7–DMN was chosen for the above catalyst evaluation for convenience in analysis, 1,7–DMN being the only isomerization product. A 1,7–DMN/2,7–DMN ratio of 0.75 represents equilibrium, higher ratios reflect appreciable disproportionation products, some of which also fall under the 1,7–DMN VPC peak. The catalysts in the table are listed in order of decreasing activity. All catalysts were activated at 400°C. for 2 hours, with the exception of the hydrogen-Y which was activated at 500°C. to remove last traces of ammonia, remoistened in air, and re-activated at 400°C. This table shows that both lanthanum-Y and cerium-Y are more active than a rare earth mixture-exchanged Type Y.

Another embodiment is the isomerization of 1,6–DMN to 2,6–DMN. The feed stock to this isomerization process is preferably low in 2,7–DMN and 1,7–DMN in order to avoid eutectic problems in the subsequent 2,6–DMN precipitation step. Therefore a desirable charge stock is a 507°–520°F. heart-cut from an extract of catalytic gas oil. This 507°–520°F. cut excludes most of the 1,7–DMN (b.p. 505°F.) and is enriched in 1,6–DMN (b.p. 510°F.). Typical feeds contain 25–30 percent 1,6–DMN. The 1,6–DMN enriched feed can be isomerized over one of the above catalysts and distilled to yield a 495°–507°F. heart-cut enriched in 2,6–DMN.

Other examples are the isomerization of o- and m-xylene to p-xylene, disproportionation of toluene to benzene and xylenes, disproportionation of Tetralin to octahydroanthracene and benzene, disproportionation of trimethylbenzenes to xylenes and durene, disproportionation of toluene and trimethylbenzenes to yield xylenes, and disproportionation of monomethylnapthalenes and trimethylnaphthalenes to yield dimethylnaphthalenes, and disproportionation of monomethylnaphthalenes to anphthalene and dimethylnaphthalenes.

The amount of disproportionation resulting from any of the above catalysts is a function of reaction temperature, water content of the catalyst, and catalyst geometry. For example, rare earth-Y pellets give more disproportionation than 20–40 mesh size catalyst. Increased water content, as measured by ignition loss at b 1,900°F. reduces disproportionation without affecting activity in the range of water content of 3.5 up to 5.4 percent. Above about 6–7 percent water content, activity is reduced as water content increases. Lower reaction temperatures also reduce disproportionation.

The effect of water content is illustrated in the following table:

eutectic filtrate can be passed through an adsorbent bed, not shown) (e.g., attapulgite clay, bauxite, carbon, etc.) to remove impurities which might damage the molecular sieve adsorbent. The eutectic filtrate or clay-treated eutectic filtrate is fed into an adsorbent "Eutectic Breaking" column containing a molecular sieve adsorbent. Where the adsorbent used preferentially adsorbs 2,7–DMN, the raffinate from the column is passed to crystallizer (at about 0°F.) where 2,6–DMN is crystallized and recovered. The 2,7–DMN rich adsorbent is stripped with a desorbent (e.g., toluene) and a 2,7–DMN rich desorbate fraction is removed. This desorbate fraction can be further processed by crystallization to recover 2,7–DMN (at about 0°C.).

The 1,6–DMN enriched fraction (507°–515°F. P.R.) is passed through an isomerization reactor, containing a zeolite catalyst, and the product. (a 2,6–DMN enriched stream), is recycled to the distillation unit.

FIG. 2 is a typical plot of catalyst activation temperature versus time for the programmed activation (i.e.,

| Catalyst | (%) $H_2O$ Content | Activation Temp. °C, 2 hrs. | 1,7-/2,7-DMN Ratio after 3 hrs. at 190°C | % Disproportionation |
|---|---|---|---|---|
| Rare earth-Y ⅛" pellet | 3.5 | 500 | 0.75 | 24.6 |
| | 4.9 | 400 | 0.76 | 18.1 |
| | 7.2 | 220 (1hr) | 0.60-less active | |
| Rare earth-Y 20-40 mesh | 5.4* | | 0.73 | 11.4 |
| | 11.9* | | 0.58-less active | 4.0 |

* Allowed to adsorb $H_2O$ while grinding pellets into mesh size particles.

In such liquid phase isomerization processes, the catalyst activity decreases with use and, preferably, is regenerated from time to time. Such a regeneration can be by the procedures in copending applications of Kirsch, et al., Ser. No. 830,687 filed June 5, 1969 (now U.S. Pat. No. 3,655,813 issued April, 11, 72) and Ser. No. 34,209 filed May 4, 1970, (now U.S. Pat. No. 3,706,814 issued December, 19, 72) the disclosure of which are hereby incorporated herein.

BRIEF DESCRIPTION OF THE DRAWINGS

The accompanying

Figure 1:
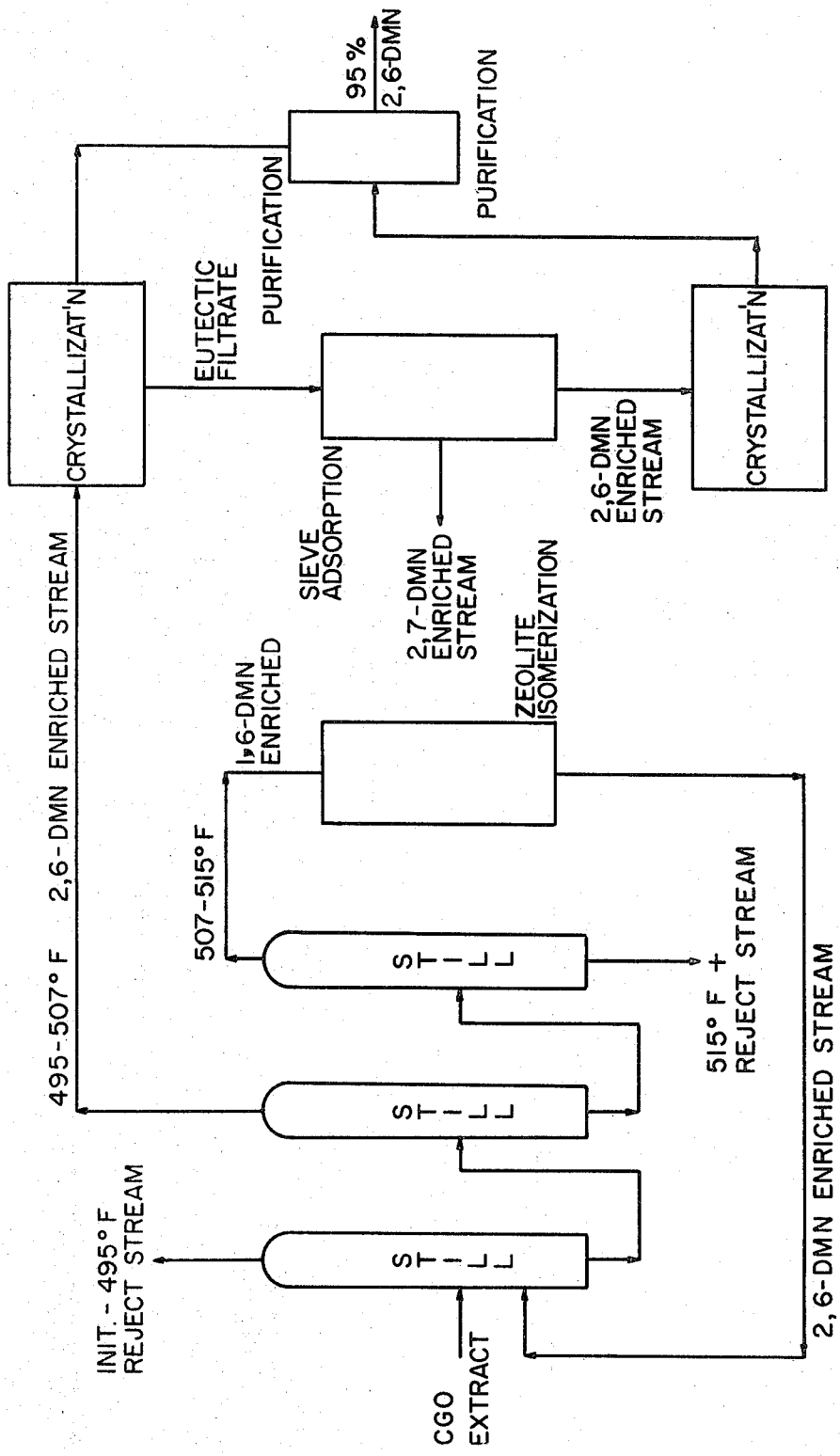
FIG. 1 illustrates the production of substantially pure 2,6–DMN by the use of a zeolite isomerization process in combination with the molecular sieve "Eutectic Breaking" adsorption process of U.S. application Ser. No. 7,273 of John A. Hedge. The feed to this process can be any petroleum stream which is rich in dimethylnaphthalenes, but preferably is an aromatic extract from a catalytic gas oil or a "bottoms" from severe reforming of high boiling naphtha. Other sources of such a feed are found in U.S. Pat. No. 3,481,996 issued Dec. 2, 1969 to Merritt C. Kirk, Jr.

In the FIG. 1 catalytic gas oil extract (by an aromatic selective solvent such as furfural) is distilled to produce a heart-cut boiling in about the 495–507 range which is rich in 2,6–DMN and another fraction, boiling in about the 507°–515°F. range, which is rich in 1,6–DMN. The 2,6–DMN enriched fraction is fed to a crystallizer (at about 70°F.) to obtain 2,6–DMN rich crystals and a 2,6–DMN "lean" filtrate. The 2,6–DMN rich crystals are further purified (as by recrystallizing) and substantially pure 2,6–DMN (e.g., 95 percent) is recovered.

The filtrate from the crystallizer is essentially eutectic with the respect to 2,6–DMN and 2,7–DMN. The water and/or $NH_3$ removal) of a zeolite. This plot shows that there can be temperature "plateaus" in such an activation.

Figure 3:
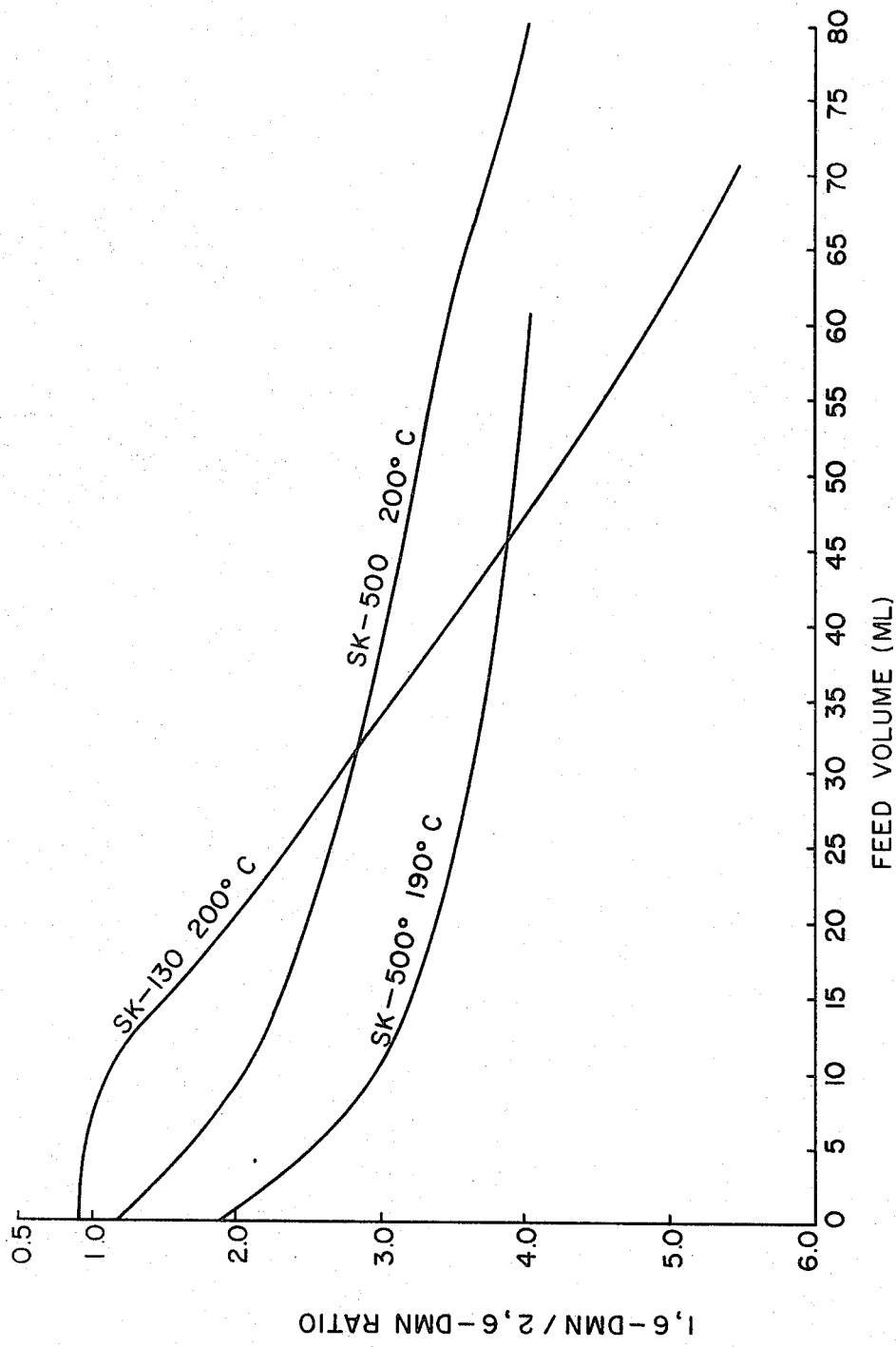

FIG. 3 is a plot of the 1,6–DMN/2,6–DMN ratio as a function of the volume of feed passed through a flow reactor. This plot illustrates the decrease in activity which can be observed as the catalyst ages and shows the utility of a regeneration step in the present process. Alternatively, hydrogen pressure can be used to improve catalyst life.

Figure 4:
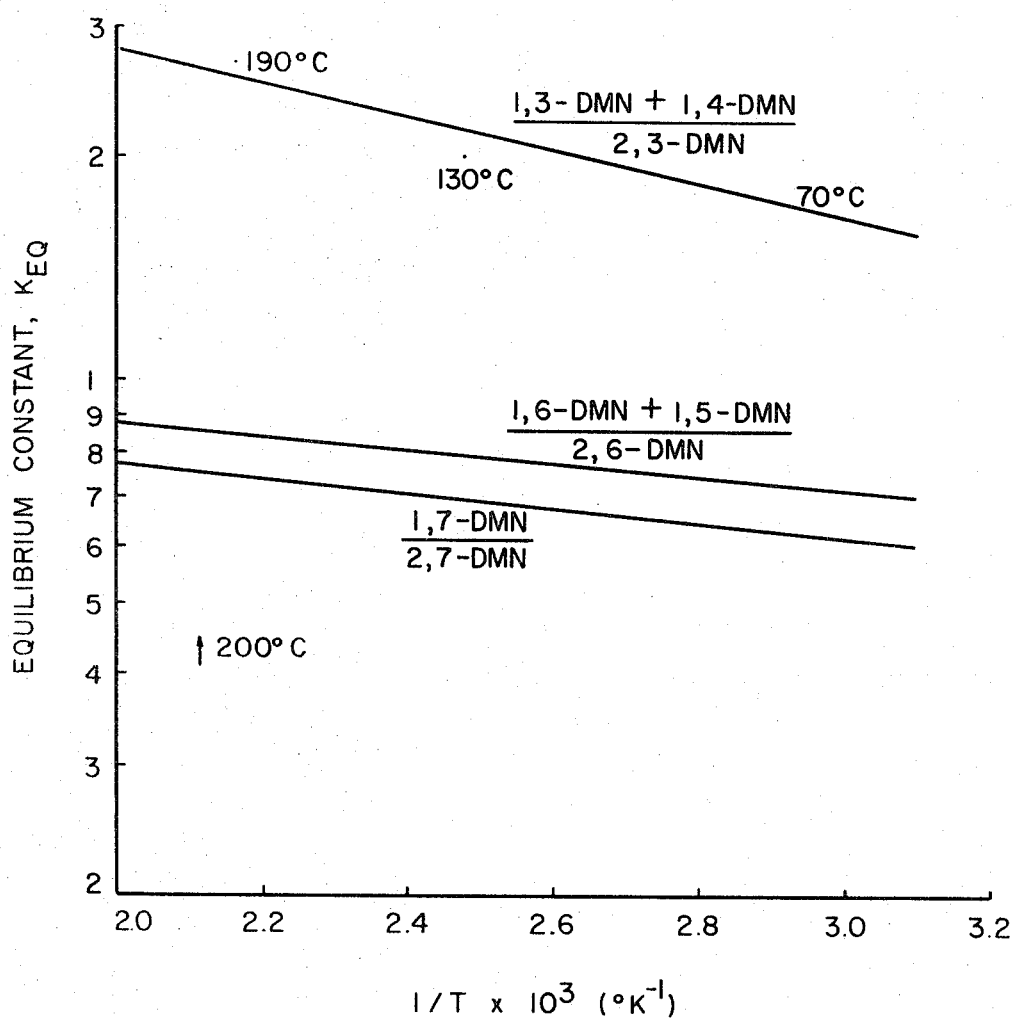

FIG. 4 plots the equilibrium constants in the DMN families as a function of the reciprocal of the absolute temperature. This plot can be used to determine whether thermodynamic equilibrium has been obtained with a given catalyst at a given temperature. For example, note that equilibrium constants at 190°C. are shifted toward 1-substituted isomers (as is further shown below):

| | | 70°C | 190°C |
|---|---|---|---|
| Keq | $\dfrac{1,6\text{-DMN} + 1,5\text{-DMN}}{2,6\text{-DMN}}$ | 0.76 | 0.85 |
| Keq | $\dfrac{1,7\text{-DMN} + 1,8\text{-DMN}}{2,7\text{-DMN}}$ | 0.64 | 0.75 |
| Keq | $\dfrac{1,3\text{-DMN} + 1,4\text{-DMN}}{2,3\text{-DMN}}$ | 1.75 | 2.55 |

In addition to isomerization, methyl group disproportionation can occur and formation of $C_{11}$ and $C_{13}$ methylnaphthalenes can be a significant side reaction.

FURTHER DESCRIPTION

In the preferred alumino-silicate zeolite catalysts, at least 20 percent and, preferably, at least 40 percent (typically, 50–80 percent) of the electronegativity associated with the alumino-silicate framework is satisfied by cations of polyvalent metals or of oxides or hydroxides of such metals. Further preferred is that the zeolite catalyst contains less than one alkali metal cation (e.g., $Na^+$) for every 4 aluminum atoms in the alumino-silicate framework (more preferred, less than one such cation for every 10 such Al atoms). Preferably, the alumino-silicate zeolite is at least 10 percent crystalline (by X-ray analysis) and is chemically characterized by the empirical formula $M_x(AlO_2)_x \cdot (SiO_2)_y(H_2O)_z$, where $x$, $y$ and $z$ are integers, the ratio $x/y$ being from 1.0 to 0.2 and where M is chosen from one of the following groups:(or a combination of equivalent valence of members of two or more said groups).

1. a tetravalent, trivalent or divalent metal, metal oxide or metal hydroxide when the atomic ratio Al/Si of said alumino-silicate is greater than 0.65, there being at least one said cation for every 16 atoms of Al in the alumino-silicate tetrahedra (or framework) of said zeolite;
2. trivalent or divalent metal, metal oxide or metal hydroxide when the atomic ratio Al/Si of said alumino-silicate is from 0.65 to 0.35, there being at least one said cation for every 12 atoms of aluminum in said framework; and
3. divalent metal, metal oxide or metal hydroxide, when the atomic ratio Al/Si of said alumino-silicate is less than 0.35, there being at least one said cation for every 8 atoms of aluminum in said framework.

and wherein the balance of the cations necessary for electronic equivalency comprises $H^+$ or cations of metals, metal oxides, or metal hydroxides and wherein there is less than one alkali metal cation for every four atoms of aluminum in the alumino-silicate zeolite, more preferably, less than one alkali metal cation for every ten atoms of aluminum. This latter requirement can be also considered as requiring that less than 25 percent (more preferred less than 10 percent) of the exchange capacity of the zeolite is satisfied by cations of an alkali metal.

The preparation of such zeolites (which contain such polyvalent cations) is well known. A typical procedure comprises aqueous exchange of a sodium form of the zeolite (e.g., Linde Type Y) with polyvalent metal ions (as with an aqueous cerium nitrate.) More preferred is to first exchange a sodium faujasite with aqueous ammonium ions until the resulting ammonium-zeolite contains less than one cation of sodium for every 4 atoms of aluminum in the framework (more preferred less than one sodium cation for every 10 or 20 atoms of aluminum). The resulting ammonium-zeolite can then be exchanged with polyvalent cations to produce the desired zeolite. Upon activation, as by heating in air, water is removed and any residual ammonium ions decompose to form "protonic" or "cation deficient" sites. The symbol $CeNH_4Y$ is sometimes used to denote a predominantly cerium ammonium-Y zeolite of low sodium content (of the preferred class referred to herein) and, after activation, the resulting cation deficient zeolite can be denoted as "CeHY" or less precisely, "CeY." However, it should be noted that, depending upon activation conditions, the cerium can be present in a number of cationic forms, e.g., $HOCe^{+2}$ or $Ce^{+3}$ etc, and the hydrogen in the zeolite may be protonic or hydroxyl. Whether in one or a combination of such forms, any polyvalent metal containing zeolite of the type described herein can be useful in the process of this invention.

In general, the ratio $x/z$ in the empirical formula of a zeolite is preferably in the range of 0.25 to 6. If excess water is present (over that desired for a given reaction) the zeolite can be activated by heating according to the procedure disclosed in the aforementioned applications of Kirsch, Barmby and Potts. If the zeolite is deficient in "bound" water, such water can be added, as by exposure to steam in air or nitrogen.

Operative polyvalent cation-containing zeolites can be those taught in U.S. application Ser. No. 716,190 of Kirsch, et al. As used herein, the term "framework," in reference to the alumino-silicate portion of the zeolite (which can be crystalline or amorphous), excludes those aluminum ions which are in exchange positions and which are neutralizing some of the negative charge associated with the aluminum atoms in the alumino-silicate tetra-hedra of the zeolite. Note that aluminum in the alumino-silicate framework can be either trigonal or tetrahedral.

If, at a given reaction temperature, the catalyst activity appreciably decreases during the course of the reaction, it is sometimes advantageous to add water (e.g., steam) with the feed. An increase in reaction temperature can often be used to prolong effective catalyst life. Alternatively, the catalyst can be separated from the hydrocarbon reactants and regenerated, as by burning in air, or mixtures of air and inert gas such as nitrogen. After such burning, water can be added to the catalyst, as by exposure to hydrogen or to steam in air or nitrogen.

ILLUSTRATIVE EXAMPLES

Example 1

This example illustrates a method of zeolite screening to determine initial activity for isomerization. Various molecular sieve zeolites, in pellet form, were activated in air at 400°C for 2 hours and tested for isomerization activity in batch runs with a 2,7–DMN to catalyst ratio of 5 to 1. The 2,7–DMN isomer was chosen to facilitate analyses since 1,7–DMN is the only other major DMN isomer in this isomer family.

Analyses were done by gas chromatography with a column consisting of 10 percent Bentone 34, 7 percent neopentyl glycol adipate terminated with SE–30, and 2 percent neopentyl glycol adipate on acidwashed Chromosorb W. These test results are reported in Table I and show initial activity only. They do not measure "life" or longer term activity, which can be studied in a flow reactor.

Example 2

This example shows that catalyst geometry is important and cannot be ignored in catalyst screening.

Example 1 was repeated, with various powdered catalysts. The results are shown in Table II, Comparison of ⅛ inch pellets of SK–500 to 20 × 40 mesh particles of SK–500 shows that liquid phase diffusion into a ⅛ inch catalyst pellet clearly limits the reaction rate (see below). No powdered SK–500 was available.

| Catalyst Geometry | 1,7-/2,7-DMN Ratio,190°C 1 hr. |
|---|---|
| SK-500 pellet (⅛ in.) | 0.61 |
| SK-500 20 × 40 mesh | 0.74 (equilibrated) | but even higher apparent activity would be expected from powdered SK–500. However, powdered zeolite is too small in particle size to be used in a fixed bed, liquid phase reactor. Particles in the range of 20–40 mesh appeared to be the best compromise for a fixed bed, liquid phase isomerization. The powder could be used in a slurry reactor system (such as those of the applications of Kirsch, et al.).

In general, catalysts in Table I and Table II can not be directly compared because of the difference in catalyst geometry. Note that grinding of SK–500 or SK–130 to 20 × 40 mesh size yielded sieves with equal or higher activity than many of the powdered zeolites.

Example 3

This example shows that activation procedure is important. Commercial zeolites (e.g., NaY) are usually available in sodium form. The sodium is frequently removed by exchange with ammonium ions. The ammonium ions must be removed by heating (e.g., to 500°C) before a sieve is active. Poor activity can be caused by incomplete removal of ammonium ions.

Figure 2:
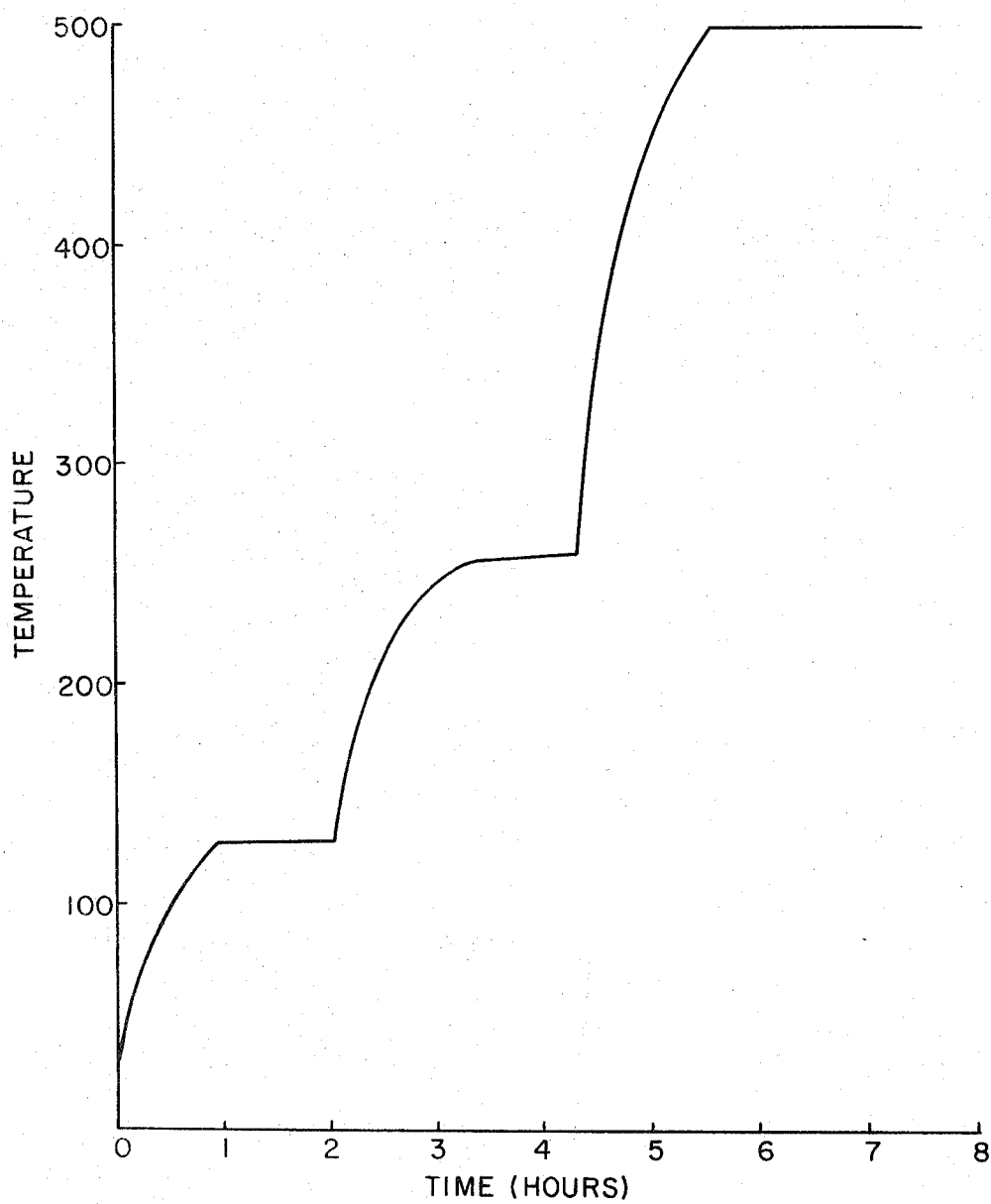

H–Y sieve which was activated to 400°C for 2 hours showed almost no activity. The same sieve activated to 500°C for 2 hours, remoistened in open air at 25°C, and activated at 400°C for 2 hours, showed good activity (0.59 1,7–/2,70–DMN ratio, 1 hour, 190°C). Similar results were obtained in activation of a Ni—$NH_4$—Y sieve. For some purposes, an optimum activation temperature of 600° to 650°C has been reported for H–Y sieve. [see D. A. Hickson and S. M. Csicsery, J. Catalysis 10, 27 (1968)]. U.S. Pat. No. 3,549,557 to Bolton, et al., issued Dec. 22, 1970 (Cl 252:455) teaches that the optimum paraffinolefin alkylation activity of certain polyvalent cation-containing zeolites requires actuation at $600^{+}$°C. The temperature-time profile for the activation procedure of the present examples is shown in FIG. 2. For screening work 400°C was found to be the maximum preferred activation temperature, providing that (with ammonium-exchanged zeolites) ammonia is first removed by heating at 500°C, and the zeolite is partly or fully rehydrated prior to the 400°C activation.

Example 4

This example (and Example 5) shows the effect of water content on catalytic activity.

Pelletized samples of Linde SK–130 and SK–500 were ground and screened to 20–40 mesh size. This was done in moist air to allow both catalysts to adsorb water.

Samples of mesh size SK–500, now containing 11.9% $H_2O$, were activated according to the temperature profile in FIG. 2 to maximum temperatures of 350°, 400°, 450°, and 500°C. These samples were then studied to determine the effect of water content on catalyst activity. As shown in Table III, samples of SK–500 activated at 350° to 500°C (4.29 to 3.67% $H_2O$, respectively) were all quite active, having slightly lower activity than the Ce—Y of Table II. Therer may have been a very slight increase in activity with increased activation temperature, but within this 350°–500°C range there was little change in activity. The results can be compared with Bronsted acidity studies by J. W. Ward. J. Catalysis, 2, 225–36 (1967). With higher water contents (5.4 and 11.9% $H_2O$), activity in both isomerization and disproportionation to $C_{11}$ and $C_{13}$ dinuclear aromatics decreased.

Example 5

Two samples of SK–130, containing 4.5% $H_2O$, were activated at 350° and 500°C. The SK–130 activated at 350°C. (4.06% $H_2O$) was the most active catalyst found in the screening program. The second sample activated at 500°C (3.77% $H_2O$) was slightly less active. This indicates that too much water had been removed from the sample activated at 500°C. Activation temperatures higher than 550°C should further decrease initial catalyst activity.

Example 6

This example shows the results of a flow reactor study of longer term catalyst activity. Samples of SK–130 and SK–500 (activated at 350°C) were studied in an atmospheric pressure, liquid phase flow reactor at 200°C. Charge stock containing 25.4 percent 1,6–DMN and 4.4 percent 2,6–DMN was pumped over the catalyst at an LHSV of 6.0. The reactor containing 2.50 g. catalyst was immersed in a constant temperature bath, giving excellent temperature control.

Results of these two runs at 200°C are shown in FIG. 3. SK–130 shows higher initial activity, but its activity decreases more rapidly than SK–500. The two curves cross at about 12 bed volumes of charge. Disproportionation activity is initially quite high (44.7 percent of initial isomerizate over SK–130), but drops even more rapidly than isomerization activity. It is believed that 400–600 psi hydrogen pressure would act to prolong catalyst life in a vapor phase reaction.

As shown in Table II, a 1,7–/2,7–DMN ratio higher than 0.75 indicates the formation of other 1-substituted DMN's which fall under the 1,7–DMN peak of the chromatogram. These other DMNs outside the 2,7–DMN family result from recombination (e.g., transalkylation) of $C_{11}$ plus $C_{13}$ disproportionation products. At 190°C with SK–130, a maximum 2,6–DMN content of 3.3 percent was observed after 22 hours in the batch reaction. Higher temperatures would favor higher disproportionation rates; however, disproportionation activity drops rapidly in a flow system.

Example 7

A third flow reactor run, Sk–500 at 190°C was made to illustrate the effect of temperature on conversion. This run is also shown in FIG. III.

One major conclusion from these runs is that high initial activity (in a batch run) does not necessarily indicate high overall activity or long catalyst life. In fact, with the two catalysts of Examples 6 and 7, higher initial activity resulted in shorter catalyst life.

Note that with Sk–500, activity fell to 28 percent of its initial activity after 12 bed volumes and to 15 percent after 28 bed volumes. Therefore, catalyst reactivation can be useful in the present process, if too frequent activations do not place the process at an economic disadvantage.

This rapid catalyst deactivation plus an unfavorable shift in the 1,6–/2,6–DMN equilibrium constant at 200°C (0.87) vs. 70°C (0.63) indicate that conventional HF—$BF_3$ catalyst is preferred for this reaction (i.e., to produce 2,6–DMN). However, hydrogen pressure (e.g., 400–600 psi) can be used to improve catalyst life and lower chemical consumption costs (with zeolites) can lead to choice of the present invention over a process using such "conventional" catalyst.

A number of multivalent cations can yield useful catalysts for disproportionation, isomerization, hydroisomerization and transalkylation when exchanged with the sodium of a sodium from crystalline aluminosilicate having uniform pure openings between about 5 and about 15A. All or a portion of the exchangeable sodium can be exchanged with salts of one (or a combination) of the metals listed below, (which are multivalent and thus capable of forming Me(OH) sites for Bronsted acidity). Furthermore, many have multiple oxidation states useful in reactions involving oxidation-reduction mechanisms. The more preferred of these preferred metals are: Cr, Mn, Fe, Co, Ni, Cu, Ag, Zn, Cd, Al, Ge, Sn, and Pb. Less preferred metals are Ti, V, Nb, Mo, Tc, Hf, Ta, W, Re, Au, Hg, Ga, In, Tl, Sb, and Bi, which can also be used to produce metal-exchanged molecular sieves. Also useful are members of the actinide family (which have more recently become available for catalytic purposes by recovery from spent nuclear reactor fuel. These include Ac, Th, Pa, V, Np, and Pu.

The potential usefulness of any of these metal exchanged molecular sieves is linked with water content of the activated sieve. Each of these sieves can have a different water content vs activation temperature profile and must be evaluated at or near their optimum water contents, (which can be determined by "screening run" experiments).

The metal-exchanged zeolites listed above have sufficient acidity to catalyze isomerization reactions of alkylaromatics such as the isomerization of 1,6–DMN to 2,6–DMN, Isomerization of methylindans to Tetralins can also be done with these catalysts. These catalysts can be useful in other acid catalyzed processes such as isomerization, disproportionation, cracking, reforming, alkylation, and polymerization.

Any of the above molecular sieves can be further exchanged with rare earths, or impregnated with platinum group metals to improve activity in isomerization and/or hydroisomerization of dimethylnaphthalenes and for disproportionation of alkylnaphthalenes.

Isomerization of mixed dimethyldecalins (DMD's) using HF—BF$_3$ AlCl$_3$—HCl, and AlBr$_3$—HBr is known. (e.g., see U.S. Pat. No. 3,243,469 to A. Schneider, issued Mar. 29, 1966). Trans-trans 2,6–DMD is the highest melting isomer and can be crystallized from the isomerized mixture. The remaining liquid isomers are recycled to the isomerization. Thus all dimethylnaphthalene isomers can be converted to the desired 2,6–DMN via this DMD isomerization route.

The catalysts and process steps described herein can also be used for isomerization of dimethyldecalins. One objective was to isomerize a dimethyldecalin mixture to increase the amount of trans, syn-2-syn-6-dimethyldecalin (TSS–2,6–DMD). This isomer can be removed by low temperature crystallization (e.g., see U.S. Pat. No. 3,541,175 to Hedge, issued Nov. 17, 1970) and the remaining dimethyldecalins can then be re-equilibrated.

Isomerization rates of dimethydecalins with RE-Y (i.e., rare earth exchanged Type Y zeolite) sieves at 190°C were much slower than for dimethylnaphthalenes. Furthermore, the desired TSS–2,6–DMD isomer was found to be present in significantly lower amounts at 190°C. Only about 13 percent TSS–2,6–DMD is present at equilibrium at 230°C.

For example, 2,7–dimethyldecalin (2,7–DMD) can be isomerized at 190°C) by rare earth exchanged Type Y molecular sieve (e.g., Linde SK–500). The isomerized DMD mixture upon dehydrogenation over Pd on carbon contains:

```
7.0% 1 + 2 Ethylnaphthalene
21.5% 2,6-DMN
21.5% 2,7-DMN
43.0% Other DMN's
7.0% 2,3-DMN
```

Note that this conversion is not possible with dimethylnaphalenes since the 2,6–DMN and 2,7–DMN families are not interconvertible. The isomerizate is water white; thus, sieve life between recycles may be considerably longer than for the 1,6–DMN to 2,6–DMN isomerization described in the present application. Hydrogen pressure (e.g., 15–15,000 psi) can also be used to prolong catalyst life.

A single isomer was used in the run described above in order to facilitate analysis. However, the process can involve isomerization of the entire mixed DMD stream obtained by hydrogenation of a 495°–518°F heart cut from an extract of catalytic gas oil.

Other acidic zeolites can also isomerize DMDs. Decationized zeolites and metal exchanged zeolites are examples of such acidic zeolites. Water content of these sieves may be critical for desired activity, as determined by screening runs.

A wide range of temperatures are applicable. The hydrocarbon can be in liquid or vapor or mixed (e.g., trickle) phase. Rate of catalyst deactivation vs. desired conversion rate will govern the optimum operating temperature and reaction time.

Isomerization, or hydroisomerization, using a zeolite catalyst) of the methyl group on the aromatic ring of three dimethyltetralin isomers yields 2,6–dimethyltetralin (2,6–DMT).

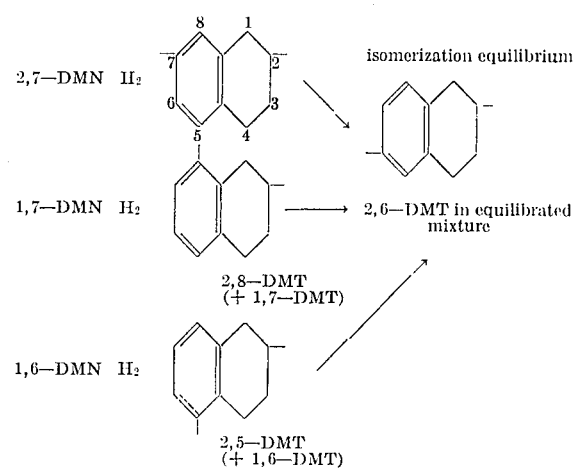

Catalysts with HF—BF$_3$ at 20°–70°C or with acidic zeolites (e.g., 190°–250°C) is effective for this isomerization.

Approximately 30–33 percent 2,6–DMT is present in the equilibrium mixture at 28°C starting with pure, 2,7–DMN, or 1,7–DMN. With mixed DMT's from a dimethylnaphthalene concentrate, other DMT isomers which are not convertible to 2,6–DMT are present, and the amount of 2,6–DMT in the isomerizate is only 25 percent greater than in the charge (from 13.6 percent in the charge up to 17.3 percent 2,6–DMT in the isomerizate).

Isolation of 2,6–dimethylnaphthalene (2,6–DMN) from the isomerizate can involve either (1) crystallizing out 2,6–DMT and then dehydrogenating or (2) dehydrogenating the entire DMT isomerizate and then crystallizing out 2,6–DMN.

The biphenyl route to 2,6–DMN can consist of:

1. Hydrogenation of biphenyl to dicyclohexyl
2. Isomerization of dicyclohexyl (as with a zeolite) to mixed dimethyl decalins
3. Crystallization of trans-syn-2-syn-6-dimethyl decalin (TSS–2,6–DMD) with recycle of filtrate to the isomerization step
4. Dehydrogenation of TSS–2,6–DMD to 2,6–DMN "AlCl$_3$–sludge" catalyst at 50°C can give the desired equilibration reaction within 2 hours. Since only 15 wt percent free TSS–2,6–DMN is produced in each isomerization, there is preferably, a recycle of 85 percent of the isomerizate from the filtration step back to the isomerization step. Thus, the capacity of the isomerization vessel controls production.

Dehydrogenation studies show that fresh unmodified RD–150 Pt on alumina catalyst is suitable if neat DMDs are charged to the reactor. Product purities of 95–98 percent can be achieved after distillation of small amounts of unconverted DMD's. Catalyst life exceeded 10 volumes of hydrocarbon even in a nonpressurized system. New rhenium-platinum reforming catalysts now available should make this step operable with 100 psi pressure (vs 400 psi estimated for RD–150).

Table 1

PELLETED CATALYST SCREENING RUNS

| Catalyst | 1,7-/2,7-DMN Ratio after 1 hr. | % Side Products (*) | 1,7-/2,7-DMN Ratio after 3 hr. | % Side Products | Act. Temp. (°C) | H$_2$O Content (%) |
|---|---|---|---|---|---|---|
| SK-130 (RE-Y) | 0.57 | 27.1 | 0.74 (equilibrium) | 34.9 | as Received | 2.86 |
| SK-500 (RE-Y) | 0.52 | 10.7 | 0.76 (equilibrium) | 18.1 | 400 - 2 hrs. | 4.87 |
| SK-120 (Pd-RE-Y) | 0.43 | 12.1 | 0.71 | 17.2 | 400 - 2 hrs. | 5.28 |
| Union Pd-Y | 0.41 | 6.8 | 0.54 | 10.6 | 400 - 2 hrs. | 4.82 |
| Ni-NH$_4$-Y | 0.18 | 2.1 | 0.29 | 2.4 | 500 equilibrated, then 400 - 2 hrs. | |
| Ni-NH$_4$-Y | 0.06 | 1.3 | 0.14 | 1.2 | 400 - 2 hrs. | 4.72 |
| Ni-Y$^{(1)}$ | 0.03 | 1.4 | 0.10 | 1.4 | 400 - 2 hrs. | 3.95 |
| Cu-NH$_4$-Y | 0.01 | 1.2 | 0.01 | 1.0 | 400 - 2 hrs. | 2.73 |
| Cu-Y | Inactive | | | | | |
| Linde 5A | Inactive | | | | | |
| SK-400 (1% Cu-Y) | Inactive | | | | | |
| SK-410 (1% Ni-Y) | Inactive | | | | | |

Batch Isomerization of 2,7-DMN to 1,7-DMN at 190°C over ⅛ in. pellet, 5:1 hydrocarbon to catalyst weight ratio.
* Mono- and trimethylnaphthalenes resulting from disproportionation.

Table II

POWDERED CATALYST SCREENING RUNS

| Catalyst | 1,7-/2,7-DMN Ratio after 30 min. | % Side Products | 1,7-/2,7-DMN Ratio after 1 hour | % Side Products | Act. Temp. (°C) | H$_2$O Content % |
|---|---|---|---|---|---|---|
| La-Y | 0.75 equilibrium | 26.9 | 0.77$^{(1)}$ | 31.2 | 400 – 2 hr. | 9.66 |
| Ce-Y | — | — | 0.75 equilibrium | 19.3 | 400 – 2 hr. | 3.72 |
| H-Y | 0.20 | 2.4 | 0.59 | 4.7 | 500 equilibrated then 400 – 2 hr. | 6.07 |
| H-Y | — | — | 0.01 | 1.5 | 400 – 2 hr. | 6.67$^{(2)}$ |
| H-Mordenite | Essentially Inactive | | | | 700 – 2 hr. | |

Batch Isomerization of 2,7-DMN to 1,7-DMN at 190°C over powdered sieve; 5:1 hydrocarbon to catalyst weight ratio.
(1) Ratios higher than 0.75 are caused by appearance of other 1-substituted DMN's under the 1,7-DMN peak. These other 1-substituted DMN's are formed by recombination of disproportionated side products, i.e., C$_{11}$ + C$_{13}$ → C$_{12}$.
(2) H$_2$O plus NH$_3$.

Table III

EFFECT OF WATER CONTENT ON CATALYTIC ACTIVITY

| Catalyst | Act. Temp. (°C) | Water Content % | 1,7-/2,7-DMN Ratio After 30 min. | % Side Products | 1,7-/2,7-DMN Ratio After 1 hr. | % Side Products |
|---|---|---|---|---|---|---|
| SK-130 | 350 — 2 hr. | 4.06 | 0.79 | 28.6 | 0.82 | 32.0 |
| SK-130 | 500 — 2 hr. | 3.77 | 0.76 | 22.1 | 0.78 | 26.0 |
| SK-500 | 500 — 2 hr. | 3.67 | 0.72 | 11.7 | 0.74 | 16.7 |
| SK-500 | 450 — 2 hr. | 3.77 | 0.70 | 9.5 | 0.73 | 13.2 |
| SK-500 | 400 — 2 hr. | — | 0.71 | 11.6 | 0.74 | 16.4 |
| SK-500 | 350 — 2 hr. | 4.29 | 0.69 | 9.4 | 0.74 | 13.0 |
| SK-500 | — | 5.40 | — | — | 0.63 | 7.1 |
| SK-500 | — | 11.94 | — | — | 0.41 | 2.3 |

Batch Isomerization of 2,7-DMN to 1,7-DMN at 190°C over 20–40 mesh sieve; 5:1 hydrocarbon to catalyst weight ratio

The invention claimed is:

1. Process for isomerization, disproportionation or transalkylation of a feed consisting essentially of methyl naphthalenes comprising contacting said feed, at a conversion temperature, with a crystalline zeolite catalyst containing cations of lanthanum or at least one rare earth metal, said zeolite catalyst having a framework with an atomic ratio Al/Si in the range of 0.35–1.0 and containing in the range of 2–12 wt. percent water which can be evolved on ignition analysis at 1,900°F.

2. Process of claim 1 wherein said water content is in the range of 3–6 wt percent and wherein isomerization predominates over disproportionation.

3. Process of claim 2 wherein said methylnaphthalene is a dimethylnaphthalene.

4. Process according to claim 1 wherein said framework is of the faujasite structure.

5. Process of claim 1 wherein said catalyst contains, on an ignited basis, less than 1 wt percent of sodium and at least 8 percent of cerium or lanthanum or a mixture thereof.

6. Process of claim 2 wherein said conversion temperature is in the range of 120°–200°C.

7. Process of claim 1 wherein disproportionation occurs and wherein said conversion temperature is in the range of 200°–240°C and said feed contains trimethylnaphthalenes and monomethylnaphthalenes in about equimolar ratio.

8. Process of claim 3 wherein 1,6-dimethylnaphthalene is isomerized to 2,6-dimethylnaphthalene and wherein said feed is a 507°–520°F heart-cut from an extract obtained by extraction with an aromatic selective solvent of a catalytic gas oil boiling in about the 480°–520°F. range.

9. Process for the transalkylation of alkyl naphthalenes, comprising contacting an alkyl naphthalene feed material with a crystalline zeolite catalyst containing cations of lanthanum or cations of at least one rare earth metal and having a framework with an atomic ratio Al/Si in the range of 0.35 to 0.65 while maintaining an elevated temperature sufficiently high as to cause alkyl transfer of said alkyl naphthalene feed material.

10. Process of claim 9 wherein said contacting is at about atmospheric pressure in the substantial absence of molecular hydrogen.

11. Process of claim 9 wherein said feed material contains a methylnaphthalene and wherein there occurs an alkyl transfer of said methylnaphthalene.

12. Process of claim 9 wherein said zeolite also contains a platinum group metal hydrogenation catalyst.

13. Process of claim 12 wherein said zeolite catalyst contains in the range of 2–12 weight percent water which can be evolved on ignition analysis at 1,900°F.

* * * * *